United States Patent

Biehl

[11] Patent Number: 5,375,679
[45] Date of Patent: Dec. 27, 1994

[54] BALL TRANSFER RAIL FOR TABLE SAW

[76] Inventor: Roy Biehl, 6631 N. Sidney Pl., Milwaukee, Wis. 53209

[21] Appl. No.: 241,685

[22] Filed: May 12, 1994

Related U.S. Application Data

[63] Continuation of Ser. No. 953,646, Sep. 29, 1992, abandoned.

[51] Int. Cl.⁵ .......................... F16C 29/04; B60B 33/08
[52] U.S. Cl. ......................................... 182/181; 384/49
[58] Field of Search ................. 182/181; 193/35 MD; 384/49; 16/26

[56] References Cited

U.S. PATENT DOCUMENTS

| | | | |
|---|---|---|---|
| 963,956 | 6/1934 | Craig | 193/35 MD X |
| 2,779,965 | 2/1957 | Schilberg | 16/26 |
| 3,559,802 | 2/1971 | Eidus | 193/35 MD X |
| 3,744,083 | 7/1973 | Jenkins | 16/26 |
| 4,689,847 | 9/1987 | Huber | 16/26 |
| 4,696,583 | 9/1987 | Gorges | 384/49 |
| 4,778,041 | 10/1988 | Blaurock | 193/35 MD |

FOREIGN PATENT DOCUMENTS 641016  8/1950  United Kingdom .................... 16/26

OTHER PUBLICATIONS

"Free Standing Work Supports," HTC Products, Inc. bulletin, one page, Jun.-Jul. 1990.
"Air Conveying Systems," Glasgow Products, Inc. bulletin, 5 pages, Feb. 1, 1992.
"Gravity Conveyors and Accessories," Metzgar Conveyor Co. bulletin, 12 pages, 1986.
"Retractable Pneumatic Ball Transfers," Omtec Corp. bulletin, 6 pages, Jul. 8, 1992.
"Ball Units" and Ball Transfer Tables, Rand Corp. bulletin, one page, (Undated).
"Conveyor Accessories," A-Z Midwest Factory Supply Co. bulletin, one page, (Undated).
"Use It As A Caster Or Transfer," Acme Caster Company bulletin, 4 pages, (Undated).
"Wheel Rail," Masyc Southern Corp. bulletin, 4 pages, (Undated).

*Primary Examiner*—Alvin C. Chin-Shue
*Attorney, Agent, or Firm*—Andrus, Sceales, Starke & Sawall

[57] ABSTRACT

A ball transfer assembly includes a steel ball that rotates within a housing having a collar for centering the ball within the housing and a removable plug that forms a seat for the ball and retains the ball and collar within the housing. The plug has a snap lock arrangement with the housing that permits it to be removable allowing the assembly to be taken apart and cleaned. A gasket also aids in preventing the accumulation of dust and wood fibers within the housing. A series of ball transfer assemblies may be aligned in an extruded metal rail to form a long beam with equally spaced in-line ball supports each capable of 360° movement. This ball rail can be set adjacent a table saw. moulder, shaper, or band saw to provide control over the movement of sheet material being cut or moved.

11 Claims, 3 Drawing Sheets

U.S. Patent    Dec. 27, 1994    Sheet 2 of 3    5,375,679
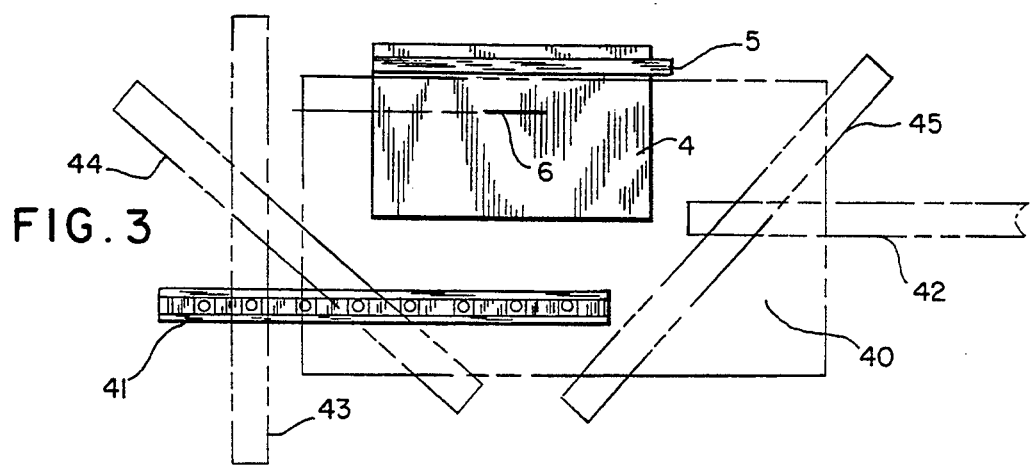
FIG. 3
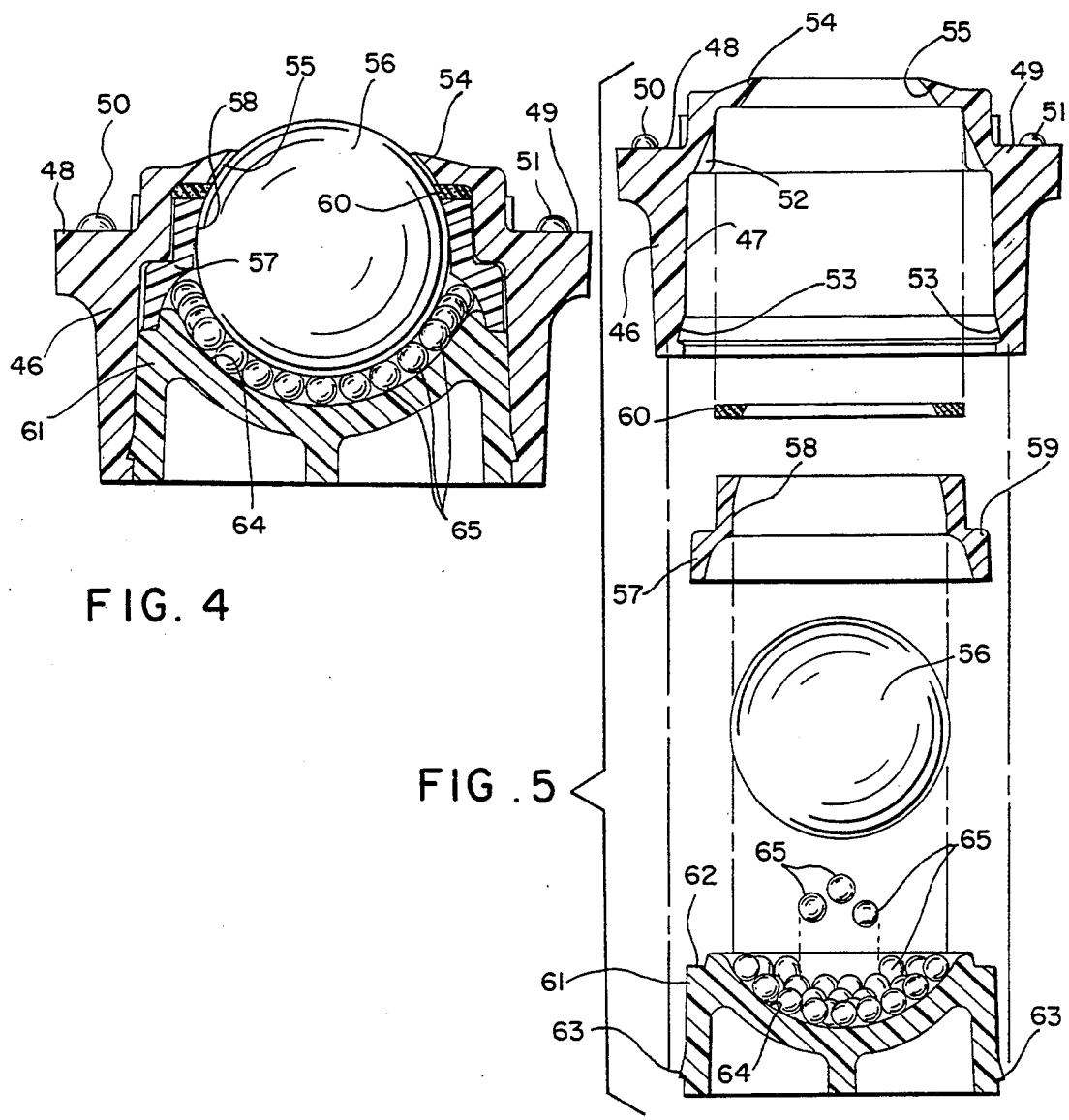
FIG. 4
FIG. 5

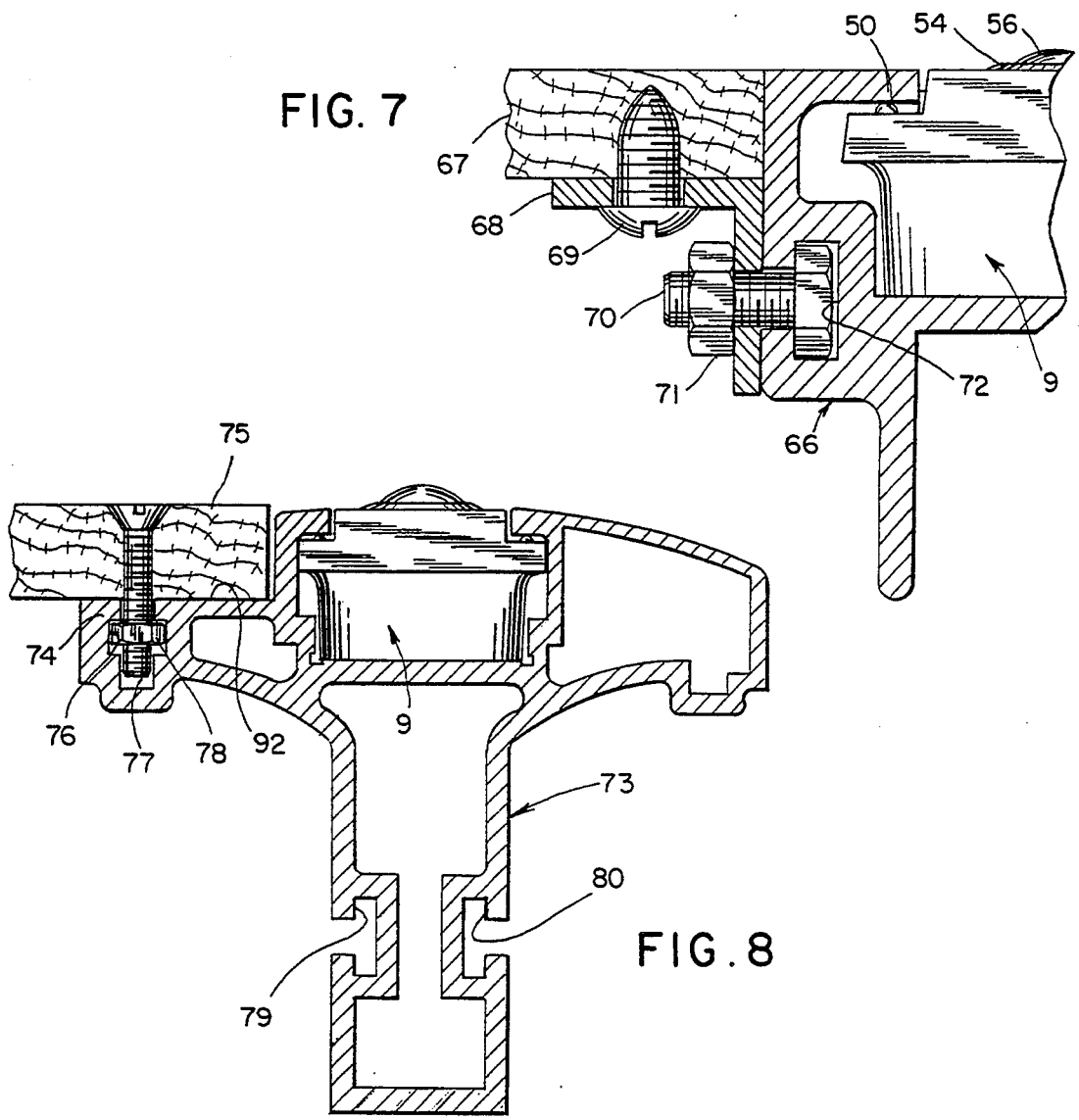
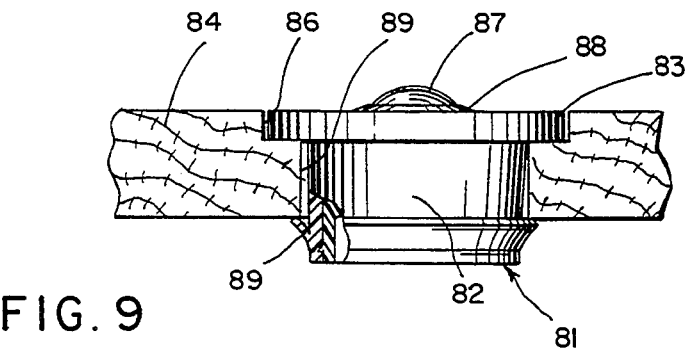

BALL TRANSFER RAIL FOR TABLE SAW

This application is a continuation of application Ser. No. 07/953,646 filed Sep. 29, 1992, now abandoned.

BACKGROUND OF THE INVENTION

The present invention relates to a ball transfer assembly for use in woodworking and sheet metal working.

Cutting large sheets of material e.g. plywood, particle-board, plastic or other heavy cumbersome sheets and keeping them in proper alignment with a saw presents a difficult problem, especially when one person is attempting to manipulate the sheet alone. Friction, when cutting on a table saw or the like, can cause large heavy sheets to stick, jump and jar when advancing the sheet through the blade resulting in a jagged, rough, or irregular cut. For example, a 4'×8' sheet of particle board which is ¾" thick weighs approximately 94 pounds, and a 1 inch thick medium density fibre board is approximately 126 pounds. For one person to manipulate a sheet of this size and weight and maintain an acceptable straight cut to close tolerances is a difficult task.

Generally, wood or other sheet material slides over the flat smooth surface of a table saw or the like by utilizing a saw horse as an extension of the table top itself. This surface, however, is typically rough and relatively large which results in a high amount of friction increasing the possibility of sticking and/or jumping of the sheet material. In order to reduce the friction, auxiliary work supports have been developed which utilize rollers, balls, casters, pneumatics and the like. Problems with such auxiliary work supports, however, still remain. For example, multiple roller conveyer systems are being used as auxiliary work support extensions for table saws but such systems are heavy, difficult to align with the saw, and take up a lot of room in the area surrounding the saw. Such extensions have an additional drawback in that the rollers do not provide 360° movement. Other devices utilize swivel caster wheels. However, swivel caster wheels are not acceptable due to their offset center of radial movement relative to the surface contact area of the wheel with the sheet material being advanced through a saw. Heavy industrial machines utilize ball transfer tables or air flotation valves incorporated into a large high volume system. Again, these types of tables take up a lot of room around the saw and generally cannot be utilized by smaller woodworking operations. In addition, the individual ball transfer units or assemblies which are incorporated into prior ball transfer tables are unitized structures which must be thrown out when dust inhibits the movement of the balls.

SUMMARY OF THE INVENTION

A ball transfer assembly includes a steel ball rotating within a housing that includes a collar for centering the ball within the housing and a removable plug that forms a seat for the ball and retains the ball and collar within the housing. The plug has a snap lock arrangement with the housing that permits it to be removable allowing the assembly to be taken apart and cleaned. A gasket also aids in preventing the accumulation of dust and wood fibers within the housing. A series of ball transfer assemblies may be aligned in an extruded metal rail to form a long beam with equally spaced in-line ball supports each capable of 360° movement. This ball rail can be set adjacent a table saw, moulder, shaper, or band saw to provide control over the movement of sheet material being cut or moved.

In one aspect of the invention, the individual ball transfer assembly units include a hollow housing having an open top and an open bottom defining a cavity formed therein with a longitudinal axis extending between the open top and bottom, race means disposed at the open top of the housing defining a ball receiving socket, ball means rotatably mounted in the ball receiving socket and dimensioned to project axially from the open top, guide means disposed within the cavity for centering the ball means in the ball receiving socket, and retaining means disposed at the open bottom of the housing for releasably retaining the ball means in the ball receiving socket and the guide means in the cavity. The retaining means includes seat means engageable with the ball means and disposed opposite of the race means which, together with the race means, allows the ball means to rotate with 360° of motion within the housing.

The retaining means preferably comprises a plug member insertable within the open bottom of the housing, and includes snap lock means for releasably retaining the ball means and guide means within the housing. The snap lock means may comprise a resilient tab projecting radially from either the plug member or housing, and a tab receiving shoulder formed in the other member. The seat means preferably comprises a spherically contoured concave surface formed in the plug member. A plurality of ball bearings disposed between the concave surface and the ball means provides relatively friction free 360° rotation for the ball means. The guide means preferably comprises an annular collar including an arcuate surface disposed to radially engage the ball means which centers the ball in the housing. The collar is held in position within the housing by the plug member forcing a shoulder formed in the collar axially against a stop formed in the housing. This also permits ready disassembly of the collar from the housing cleaning. A sealing means in the form of a gasket may also be disposed between the race means and guide means for preventing contaminants from entering the cavity through the open top and socket. The race means itself comprises an annular lip projecting radially inwardly from the housing. The annular lip has a crowned exterior surface to further prevent accumulation of contaminants at the open top of the housing.

In another aspect of the invention, a series of ball transfer units are aligned in an extruded metal rail to form a ball rail which is an auxiliary work support that can be set beside a table saw, moulder, shaper or band saw to provide control over the movement of sheet material being cut or moved. The ball rail is compact, readily portable and may easily be arranged as an auxiliary support for the sheet material by one person. The ball rail preferably is in the form of a long beam with equally spaced in line ball transfer assemblies each capable of 360° movement. The ball rail may also be adapted to attach table panels, side rails and other accessories. Also, the ball rail may be formed to include downwardly extending rail legs adapted to fit onto an existing saw horse.

BRIEF DESCRIPTION OF THE DRAWINGS

The drawings illustrate the best mode presently contemplated of carrying out the invention.

In the drawings:

FIG. 3 is a top schematic view of a table saw and ball rail illustrating in phantom various positions for locating the ball rail with respect to the table saw;

FIG. 4 is a cross-sectional view of an individual ball transfer assembly;

FIG. 5 is an exploded cross-sectional view of the ball transfer assembly of FIG. 4 illustrating the components thereof;

FIG. 7 is a fragmentary end view illustrating a second embodiment of the rail with a side panel attached thereto;

FIG. 8 is a cross-sectional view of another embodiment of the rail illustrating a different manner of attaching a side panel; and FIG. 9 is a fragmentary side view in elevation with parts broken away and in cross-section illustrating a ball transfer assembly mounted in a ball transfer table rather than a ball rail.

DESCRIPTION OF THE PREFERRED EMBODIMENTS

Figure 1:
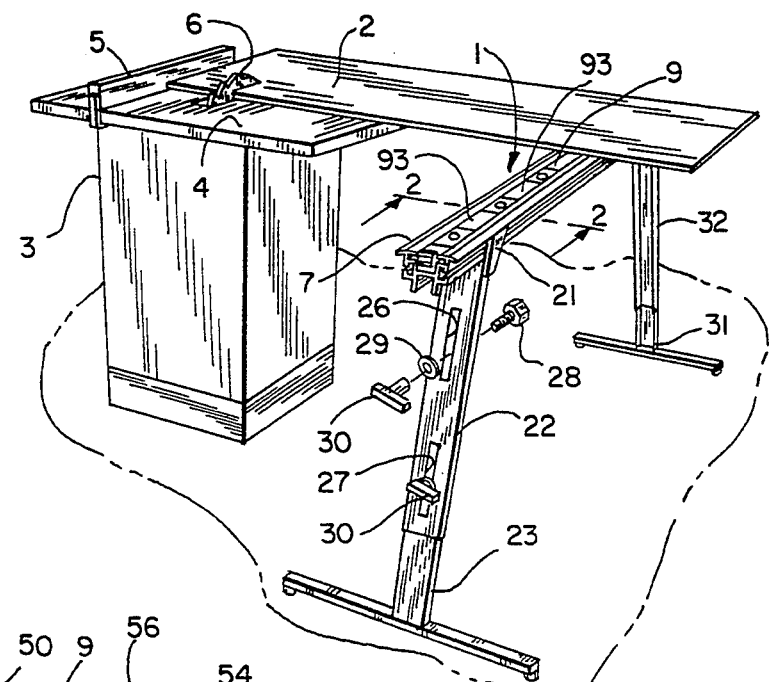
FIG. 1 is a perspective view of a table saw incorporating a ball rail constructed in accordance with the principles of the present invention.

Referring now to the drawings, FIG. 1 illustrates a ball rail generally designated by the numeral 1 and constructed in accordance with the principles of the present invention utilized as an auxiliary work support for a sheet 2 of plywood being cut by a table saw 3. As illustrated, table saw 3 includes a flat work top 4, a rip fence 5 and a rotating blade 6 for cutting sheet 2. It should be recognized that although ball rail 1 is illustrated in connection with table saw 3, ball rail 1 could readily be utilized as an auxiliary work support for a moulder, shaper, or band saw to provide control for the movement of sheet material being cut or moved in connection therewith. Thus, sheet 2 although illustrated as plywood, could also be particle board, plastic sheet material or other heavy cumbersome sheet material.

Figure 2:
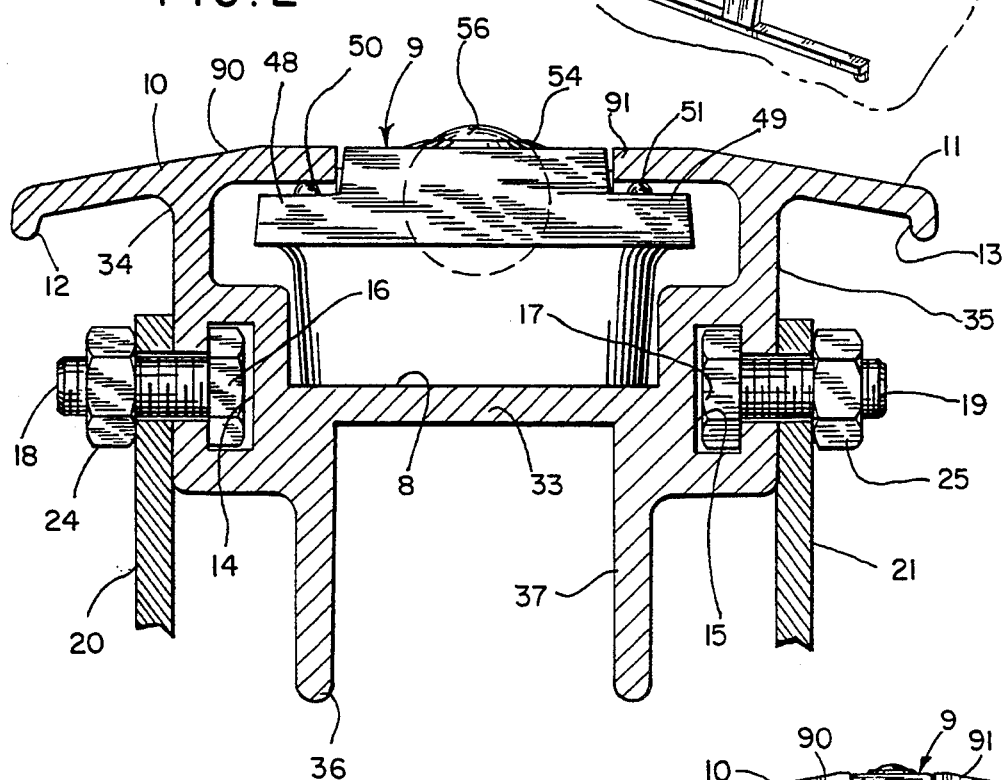
FIG. 2 is a cross-sectional view taken along the plane of the line 2—2 in FIG. 2.

As best illustrated in FIGS. 1 and 2, ball rail 1 includes a metal rail 7 formed of aluminum or other material preferably by extrusion, Rail 7 includes a longitudinally extending channel 8 for slidably receiving a series of ball transfer cartridges 9. Channel 8 is substantially T-shaped and extends the entire longitudinal length of rail 7. Rail 7 also includes angled ledges 10 and 11 extending in opposite directions from the top of channel 8 and the sides of rail 7. Ledges 10 and 11 are angled downwardly away from the center of channel 8 so that they aid in preventing contaminants such as saw dust, shavings, chips and the like from falling into channel 8 and possibly entering the interior of cartridges 9. The angle on ledges 10 and 11 also aids in directing the edge of sheet 2 over the top of rail 7 and onto ball transfer cartridges 9, and further are spaced from the underside of sheet 2 to reduce the possibility of sheet 2 catching, sticking, jumping or jarring during a cutting operation. Lips 12 and 13 on the outer ends of ledges 10 and 11 respectively add strength to ledges 10 and 11 to prevent excessive flexing or bending thereof. Rail 7 also includes a pair of slots 14 and 15 formed in opposite sides thereof. Slots 14 and 15 extend the entire length of rail 7 and are dimensioned to receive and capture heads 16 and 17 of bolts 18 and 19 respectively. Bolts 18 and 19 are utilized to mount side plates 20 and 21 respectively which in turn are connected to an upper portion 22 of leg 23. Upper portion 22 and leg 23 are thus slidable longitudinally with respect to rail 7 to adjust their location for supporting rail 7, as desired. Once properly positioned beneath rail 7, portion 22 and leg 23 are secured in position by nuts 24 and 25 turned down on side plates 20 and 21 respectively.

As shown in FIG. 1, not only is leg 23 adjustable longitudinally, but the height of rail 7 may be adjusted by sliding leg 23 within upper portion 22. Slots 26 and 27 and corresponding slots (not shown) in leg 23 are aligned and thereafter bolt 28, washer 29 and knob 30 are employed to secure upper portion 22 to leg 23 at the desired height for rail 7. Although not shown in FIG. 1, opposite leg 31 and upper portion 32 thereof would contain identical adjusting features for not only the height of rail 7 but the longitudinal position of leg 31 and portion 32 beneath rail 7.

Figure 6:
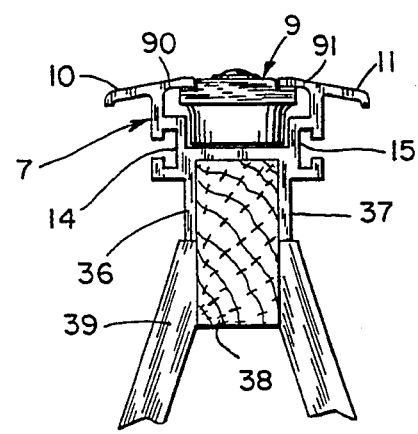
FIG. 6 is an end view of a ball rail mounted on a saw horse.

As illustrated in FIG. 2, rail 7 is substantially U-shaped, and includes a flat base or bottom 33 and opposite sides 34 and 35. Rail 7 also includes a pair of opposite downwardly extending rail legs 36 and 37 which are formed integrally with and depend frown base 33 below sides 34 and 35 respectively. Legs 36 and 37 enable rail 7 to be mounted on top of a wooden stud 38 forming part of a saw horse 39, as shown best is FIG. 6. Thus, one could remove legs 23 and 31 as well as upper portions 22 and 32, and still support or mount rail 7 on saw horse 39 if desired.

FIG. 3 illustrates the manner of use of ball rail 1 with respect to table saw 3. As schematically illustrated, a sheet 40 of material partially supported by table top 4 may also be supported by ball rail 1 in numerous ways. Ball rail 1 could be parallel with the direction of movement such as illustrated at 41 and 42, or could be orientated transversely with respect to the direction of movement as shown at 43. Finally, ball rail 1 could be orientated diagonally with respect to sheet 40 to provide support therefore, as illustrated at 44 or 45.

Referring now to FIGS. 4 and 5, there is illustrated in detail the structure of ball transfer cartridge or assembly 9. Cartridge 9 includes a hollow housing 46 having an open top and an open bottom defining a cavity 47 therein with a longitudinal axis extending between the open top and open bottom thereof. Housing 46 is substantially rectangular in shape and includes a pair of opposite shelves 48 and 49 each containing a dimple 50 and 51 respectively projecting upwardly therefrom. As shown best in FIG. 2, dimples 50 and 51 engage against the under side of flanges 90 and 91 respectively above channel 8 to accommodate any tolerances in the design and to provide a friction fit of cartridge 9 within rail 7. Flanges 90 and 91 thus hold cartridge 9 in channel 8, and although cartridge 9 is slidable within channel 8 of rail 7, it can only be slid therein by the application of sufficient force to overcome the friction between dimples 50 and 51 and the under side of flanges 90 and 91 respectively. Housing 46 also includes an annular stop 52 projecting into cavity 47 between opposite ends thereof, and a series of detent shoulders 53 formed adjacent its open bottom, the purpose of which will hereinafter be described. Finally, housing 46 also includes a race at the open top thereof formed by an annular lip 54 projecting radially inwardly from the sides of housing 46. Lip 54 provides a bearing surface 55 which forms a ball receiving socket. A steel ball 56 is rotatably mounted in the ball receiving socket and engages surface 55 to permit 360° movement thereof. Ball 56 is dimensioned to project axially from lip 54 through the open top of housing 46. As illustrated best in FIG. 4, lip 54 not only forms a race for retaining the rotating ball 56, but also functions to engage and scrape contaminants from ball 56 as ball 56 rotates within housing 46. In addition, lip 54 has a crowned exterior surface to further aid in preventing the accumulation of contaminants at the open top of housing 46.

As a means for guiding and centering ball 56 within cavity 47 and housing 46, cartridge 9 includes an annular collar 57 preferably formed of a self lubricating material such as nylon. Collar 57 includes an annular arcuate surface 58 disposed to radially engage ball 56 and center ball 56 with respect to the ball receiving socket. Collar 57 also includes an annular shoulder 59 that engages stop 52 of housing 46 to properly locate collar 57 within cavity 47, as will hereinafter be described.

An annular sealing gasket 60 is disposed between the under side of lip 54 and the top edge of collar 57, as shown best in FIG. 4. Gasket 60 prevents contaminants from entering the cavity from the open top of housing 46 and then through the ball receiving socket formed by bearing surface 55. Sealing gasket 60 is preferably composed of a foam like material or a felt like material so that it substantially fills the entire area between the upper edge of collar 57 and the under side of lip 54.

As a means for releasably retaining ball 56 in the ball receiving socket of lip 54 as well as gasket 60 and collar 57 within cavity 47 of housing 46, cartridge 9 also includes a removable plug 61 disposed at the bottom of housing 46. Plug 61 includes an annular shoulder 62 for receiving the bottom edge of collar 57 so that when plug 61 is inserted into the bottom of housing 46 shoulder 62 engages the bottom edge of collar 57 forcing collar 57 axially toward the top of housing 46 to thereby force shoulder 59 into engagement with stop 52 to properly locate collar 57. This action also forces the top edge of collar 57 to engage and compress gasket 60 into position. In order to secure plug 61 within the bottom of housing 46, there is provided a snap lock arrangement which includes a series of circumferentially spaced resilient tabs 63 projecting radially from plug 61 and a like number of tab receiving detent shoulders 53 formed in housing 46. Thus, as plug 61 is inserted into the bottom of housing 46 tabs 63 will be flexed inwardly until they reach shoulders 53 whereupon tabs 63 will snap radially outwardly into shoulders 53 and retain plug 61, collar 57, gasket 60 and ball 56 within housing 46. Removal of plug 61 can be accomplished merely by forcing tabs 63 back over shoulders 53 by withdrawing plug 61 from cavity 47.

Plug 61 also includes a seat 64 engageable with ball 56 to provide a bearing surface opposite of surface 55. Seat 64 comprises a spherically contoured concave surface as best shown in FIGS. 4 and 5. To further reduce friction between seat 64 and ball 56, cartridge 9 includes a plurality of ball bearings 65 disposed between seat 64 and ball 56. Ball bearings 65 not only reduce friction, but also uniformly distribute the load on seat 64.

Turning now to FIG. 7, there is illustrated a second embodiment of a rail 66 for use in connection with cartridge 9. This embodiment differs from rail 7 shown in FIG. 2 by eliminating ledges 10 and 11. Instead, rail 66 mounts a side panel 67 by means of at least one L-shaped bracket 68. Panel 67 may be attached to bracket 68 by means of a plurality of longitudinally spaced screws 69 (only one of which is shown in FIG. 7), and panel 67 and bracket 68 may then be attached to rail 66 by bolts 70 and nuts 71 in the same manner as previously described herein with respect to legs 23 and 31. Thus, panel 67 may be slidably attached to the side of rail 66 by sliding the heads of bolts 70 within slot 72 of rail 66 until properly positioned with respect thereto.

FIG. 8 illustrates a third embodiment of a rail 73 to be employed with cartridge 9. Rail 73 primarily differs from rail 7 of FIG. 2 in that ledge 10 is removed and replaced with a recessed ledge 74 including a planar support surface 92 projecting in a direction away from the side wall which functions to receive and support a side panel 75. In this embodiment, panel 75 is retained by screws passing through panel 75 into a slot 76 formed on the side of rail 73. Slot 76 extends the entire length of rail 73 and is adapted to capture and receive a nut 78 of screw 77. Side panel 75 may then be assembled onto rail 73 in a similar manner as that described with respect to bracket 68 and legs 23 and 31. Note that as illustrated in FIG. 8, rail 73 includes a pair of opposite slots 79 and 80 which function in the identical manner as slots 14 and 15 of rail 7 shown in FIG. 2.

Referring now to FIG. 9, there is illustrated a second embodiment of a ball transfer cartridge. In this embodiment, cartridge 81 includes a cylindrically shaped housing 82 having an annular flange 83 disposed at its top end. In this embodiment, cartridge 81 is employed in a table arrangement rather than a long beam arrangement as illustrated with respect to FIGS. 1–8. To this end, table 84 includes a plurality of spaced drilled openings 85 formed therethrough for receiving housing 82 therein. Counterbore 86 is also formed in table 84 in axial alignment with opening 85 for receiving flange 83 of cartridge 81. Thus, when inserted into opening 85, cartridge 81 is flush with the upper surface of table 84, as shown in FIG. 9. The only portion of cartridge 81 projecting from the upper surface of table 84 is ball 87 and annular lip 88 which function in the identical manner as previously described with respect to lip 54 of cartridge 9. As a means for retaining cartridge 81 in table opening 85, housing 82 includes a snap lock arrangement along the bottom thereof. The snap lock arrangement comprises a series of circumferentially spaced resilient tabs 89 projecting from the lower portion of housing 82. Thus, as cartridge 81 is inserted downwardly into opening 85 tabs 89 are bent radially inwardly to permit passage of housing 82 past the edge formed between opening 85 and counterbore 86. As flange 83 seats within counterbore 86, tabs 89 will move past the lower edge of table 84 and snap back outwardly to engage against and be caught by the underside of table 84. Cartridge 81 is thus securely held and retained in position. In order to remove cartridge 81, one must merely squeeze tabs 89 radially inwardly so that they clear the lower surface of table 84 at which time cartridge 81 may be removed upwardly out of opening 85.

Various modes of carrying out the invention are contemplated as being within the scope of the following claims particularly pointing out and distinctly claiming the subject matter regarded as the invention. For example, FIG. 1 illustrates that spacer cartridges 93 may also be inserted into rail 7. Cartridges 93 are blank spacers resulting in an assembly wherein only every other cartridge contains a ball 56.

I claim:

1. A ball transfer assembly, comprising:

a hollow housing having an open top and an open bottom defining a cavity formed therein with a longitudinal axis extending between said open top and bottom, said housing having an annular stop projecting into said cavity;

race means disposed at the open top of said housing defining a ball-receiving socket;

ball means rotatably mounted in said ball-receiving socket and dimensioned to project axially from said open top;

guide means disposed within said open cavity for centering said ball means in said ball-receiving socket, said guide means including an outer annular shoulder;

retaining means removably disposed at the open bottom of said housing in a snap-fit relationship thereto for releasably retaining said ball means in said ball-receiving socket and said guide means in said cavity, said retaining means including seat means engageable with said ball means and disposed opposite of said race means and bearing surface means extending inwardly then upwardly and merging with said seat means; and ball bearing means disposed between said ball means and said retaining means;

said guide means further including an inner, lower annular surface supported on said bearing surface means of said retaining means and defining a stop means continuously abutting said ball bearing means and an inner, upper annular surface engageable with said ball means; and said outer annular shoulder of said guide means being engageable with said annular stop on said housing to properly locate and fix said guide means in said cavity.

2. The assembly of claim 1 wherein said retaining means comprises a plug member insertable within the open bottom of said housing.

3. The assembly of claim 2 wherein said retaining means includes snap-lock means for releasably retaining said ball means and said guide means.

4. The assembly of claim 3 wherein said snap-lock means comprises a resilient tab projecting radially from one of said plug members and housing, and a tab-receiving shoulder formed in the other of said plug member and housing.

5. The assembly of claim 2 wherein said seat means comprises a spherically contoured concave surface formed in said plug member.

6. The assembly of claim 1 further including sealing means disposed between said race means and said guide means for preventing contaminants from entering said cavity from said open top and bottom socket.

7. The assembly of claim 6 wherein said sealing means comprises a gasket member.

8. The assembly of claim 1 wherein said race means comprises an annular lip projecting radially inwardly from said housing.

9. The assembly of claim 8 wherein said annular lip has a crowned exterior surface to prevent accumulation of contaminants at said open top.

10. The assembly of claim 1 further including snap-lock means on said housing for releasably retaining said housing to a supporting member.

11. The assembly of claim 1, wherein said inner, lower annular surface and said inner, upper annular surface are arcuate.

* * * * *